United States Patent
Rosenhahn et al.

(10) Patent No.: US 10,071,674 B2
(45) Date of Patent: Sep. 11, 2018

(54) PROJECTION LIGHT MODULE FOR A MOTOR VEHICLE HEADLIGHT

(71) Applicant: Automotive Lighting Reutlingen GmbH, Reutlingen (DE)

(72) Inventors: Ernst-Olaf Rosenhahn, Bodelshausen (DE); Wolfgang Hoßfeld, Gomaringen (DE); Jens Humburg, Reutlingen (DE); Benjamin Stauß, Hamburg (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 250 days.

(21) Appl. No.: 14/820,161

(22) Filed: Aug. 6, 2015

(65) Prior Publication Data

US 2016/0039330 A1 Feb. 11, 2016

(30) Foreign Application Priority Data

Aug. 8, 2014 (DE) ........................ 10 2014 215 785

(51) Int. Cl.
*B60Q 1/16* (2006.01)
*F21S 41/43* (2018.01)
(Continued)

(52) U.S. Cl.
CPC .............. *B60Q 1/06* (2013.01); *F21S 41/147* (2018.01); *F21S 41/321* (2018.01); *F21S 41/36* (2018.01);
(Continued)

(58) Field of Classification Search
CPC ..... B60Q 1/06; F21S 48/1159; F21S 48/1388; F21S 48/145; F21S 48/1747
See application file for complete search history.

(56) References Cited

U.S. PATENT DOCUMENTS

| | | | |
|---|---|---|---|
| 2008/0239742 A1 | 10/2008 | Nakada et al. | |
| 2009/0231866 A1* | 9/2009 | Yamamura | B60Q 1/085 362/466 |

(Continued)

FOREIGN PATENT DOCUMENTS

| | | |
|---|---|---|
| CN | 103443534 A | 12/2013 |
| DE | 102009008631 A1 | 8/2010 |

(Continued)

OTHER PUBLICATIONS

First Office Action dated May 24, 2017 by the State Intellectual Property Office of the People's Republic of China for Chinese Patent Application No. 201510484625.4 (12 pages).

(Continued)

*Primary Examiner* — Anh Mai
*Assistant Examiner* — Nathaniel Lee
(74) *Attorney, Agent, or Firm* — Howard & Howard Attorneys PLLC

(57) ABSTRACT

A projection light module for a motor vehicle headlight with a low-beam diaphragm, which separates a low-beam volume of the projection light module located above this diaphragm from a high-beam volume of the projection light volume located below this diaphragm, and with a high-beam diaphragm arranged in the high-beam volume, which has a vertical diaphragm edge and which divides the high-beam volume into a high-beam volume lying to the right of it and a high-beam volume lying left to it. The low-beam diaphragm and the high-beam diaphragm are components of a composite diaphragm and the high-beam diaphragm is arranged in the high-beam volume obliquely to the optical axis of the projection light module so that its distance from the optical axis of the projection light module increases with increasing distance along the optical axis from the diaphragm edge.

7 Claims, 14 Drawing Sheets

(51) Int. Cl.
   *B60Q 1/06*  (2006.01)
   *F21S 41/147* (2018.01)
   *F21S 41/32*  (2018.01)
   *F21S 41/36*  (2018.01)
   *F21S 41/663* (2018.01)
   *F21S 41/143* (2018.01)
   *F21S 41/365* (2018.01)

(52) U.S. Cl.
   CPC ............ *F21S 41/43* (2018.01); *F21S 41/663* (2018.01); *F21S 41/143* (2018.01); *F21S 41/365* (2018.01)

(56) References Cited

U.S. PATENT DOCUMENTS

2010/0226142 A1  9/2010  Brendle et al.
2014/0016343 A1  1/2014  Brendle

FOREIGN PATENT DOCUMENTS

| | | | |
|---|---|---|---|
| DE | 102010046021 A1 | 3/2012 | |
| DE | 102011012742 A1 | 6/2012 | |
| DE | WO 2012084080 A1 * | 6/2012 | .......... B60Q 1/0041 |
| DE | 102011013211 A1 | 9/2012 | |
| EP | 2 101 107 A2 | 9/2009 | |
| EP | 2336634 A1 | 6/2011 | |
| JP | 2010118274 A | 5/2010 | |
| JP | 2011146172 A | 7/2011 | |
| JP | 2012186010 A | 9/2012 | |

OTHER PUBLICATIONS

Examination Report dated Aug. 4, 2015 issued in German Patent Application No. 10 2014 215 785.4.
Official Report dated Jan. 4, 2016 issued in European Patent Application No. 15176376.0-1756.

* cited by examiner

PROJECTION LIGHT MODULE FOR A MOTOR VEHICLE HEADLIGHT

CROSS-REFERENCE TO RELATED APPLICATIONS

The present application claims priority to and all the benefits of German Patent Application No. 10 2014 215 785.4, filed on Aug. 8, 2014, which is hereby expressly incorporated herein by reference in its entirety.

BACKGROUND OF THE INVENTION

1. Field of the Invention

The present invention relates to a projection light module for a motor vehicle headlight according to the preamble of claim 1.

2. Description of the Related Art

One representative example of a projection light module of the type generally known in the related art is disclosed in DE 10 2011 012742 A1 and is adapted to generate an inner light distribution in its interior. It has a secondary lens system, which is constructed and arranged to project an image of the inner light distribution as an external light distribution into the outside perimeter of the projection light module. It further has a low-beam light diaphragm which, with a proper use of the projection light module installed in a headlight, separates the low-beam light volume located above this diaphragm from a high-beam volume of the projection light module located below this diaphragm. In the high-beam volume is arranged a high-beam diaphragm which at the aforementioned use comprises a diaphragm edge extending more vertically than horizontally, and which separates the high-beam volume into a right high-beam volume located to the right of the high-beam diaphragm and a left high-beam volume located to the left of the high-beam diaphragm. The diaphragm edge is so arranged that it is displayed by the secondary lens system in the external light distribution as a more vertically than horizontally extending bright-dark boundary.

In the last few years, headlights have been available on the market which perform lighting functions, which are controlled by a camera-based image analysis of the scene in front of the motor vehicle.

Under a light function we understand the production of a light distribution by the headlights. Examples of light distributions are low-beam light distributions and high-beam light distribution.

For example, the control allows an automatic high-beam circuit with a partial beam function, which ensures that, despite oncoming cars and/or cars driving in front of the vehicle, a part of the high beam can remain active. The headlight system generates where there are other road users a shadow or a non-illuminated partial area in the high-beam area of the light distribution, so that they are not dazzled. Such partly shaded or in some other way partly darkened light distribution is also referred to in further text as partial high-beam distribution. Such headlight systems have been implemented in various embodiments in projection light modules with gas discharge lamps. In a projection system, an interior light distribution is generated inside the headlight, which is projected by a secondary lens system as an external light distribution into the outer space in front of the headlight. In the applicant's headlight used in a series, a twin-diaphragm system is operated by a stepping motor and a gear to produce in this way various forms of bright-dark boundary in the external light distribution of a low-beam function.

In addition to such adaptive low-beam function, this known module performs a high-beam function and with a diaphragm position also a partial high-beam function, in which in a module half a high beam is generated with a vertical bright-dark boundary, wherein the bright area of the half high beam is produced on the outer side of the vehicle, and on the vehicle inner side is produced a substantially horizontal bright-dark boundary.

Under a substantially horizontal bright-dark boundary we understand a bright-dark boundary which produces a legally compliant low-beam light. This is particularly the case when the angle enclosed by this light-dark boundary with the horizon is not greater than 30°. A more vertically than horizontally oriented light-dark boundary is in contrast characterized by the fact that the angle that it encloses with a vertical line, is smaller than the angle it encloses with a horizontal line.

By a horizontal pivoting of the entire light module (about a vertical axis), the horizontal position of the vertical bright-dark boundary can be varied. The interplay of the two projection light modules in the vehicle allows setting up the shadow position and the shadow width depending on the required driving situation. With the stepper motor drive, the switching speed between the different light distributions can be varied. So, for example, the switching speed between different light distributions, for example upon the activation and/or deactivation of the high beam or the partial high beam, can be defined with manual operation differently from an automatic control on the basis of an analysis of a camera image.

Also known are partial high-beam modules in which a movable diaphragm (hinged diaphragm), which is driven by an electromagnet, is activated. In one position of the movable diaphragm, a low-beam light distribution is generated in the light projection module, and in another position of the movable diaphragm a high-beam light distribution is generated which has a vertical bright-dark boundary. The horizontal position of the vertical right-dark boundary is changed by a rotation of the whole module. By pivoting apart the modules on both mounting sides, a shadow can be generated in the central area of the high beam. So it is a bi-function with horizontal rotation for positioning the vertical bright-dark boundary: only the low beam and the partial high beam can be produced. If one considers only one module, the full high-beam function is missing. This is much more advantageous compared to the above-described system. The full high-beam function is generated by the interaction of a right headlight and a left headlight.

In the case of the high beam, however, this results in a slight disadvantage for the driver, because the respective high beam light distribution is not quite complete. In the center in front of the vehicle the high-beam distributions are indeed superimposed, but on the right and on the left only the high beam of the respective module has an effect. Moreover, the relatively sharp vertical bright-dark boundary of the two modules is in the case of the full high beam in certain driving situations recognizable for the driver as a narrow, vertical stripe of greater brightness, which is bothersome.

DE 10 2009 008 631 A1 describes a projection light modules, which works with light-emitting diodes (LED) as a light source and, using a primary lens system, which generates the inner light distribution, and a secondary lens system, which serves projection optics, and generates a low-beam light and a high-beam light. Among other things, a diaphragm in the beam path of the high beam is described there, which by a largely vertically extending edge also allows the generation of the partial high beam with a vertical bright-dark boundary. Overall, there is described a module, which generates a low beam and a partial high beam without any mechanically adjustable diaphragm. For switching on high beam, only additional light sources must be switched on, and the additional vertical diaphragm automatically results in a partial high beam, which makes this module also a bi-functional light module.

The aforementioned DE 10 2011012 742 A1 describes a projection light module which with an array of reflectors and light-emitting diodes and a mirror diaphragm generates a low beam, and which in the high-beam operation can generate two partial high beams by an additional vertical diaphragm which is aligned along the direction of travel of the vehicle. By switching on and off the light sources of the two high-beam chambers separated by the vertical diaphragm, one can generate either a full high beam (as the sum of both partial high-beam distributions) or an only right-bright or only left-bright partial high-beam light distribution by switching on only the light source of one of the two high-beam chambers. The vertical diaphragm between the partial high-beam chambers may be coated with light-reflective material.

The high-beam diaphragm is placed such that the two high-beam chambers are situated axis-symmetrically to each other in relation to a vertical line extending through the HV point, wherein the vertical bright-dark boundaries which arise as images of the vertical diaphragm, lie on the vertical.

SUMMARY OF THE INVENTION

The present invention overcomes the disadvantages of the related art in an improved projection light module having a reduced number of mechanically moving components and a relatively simple structure while maintaining variable functionality that produces different partial high-beam components that are able to achieve high levels of illuminance and easy adaptability.

The invention of the projection light module of the present invention differs from the related art in that the low-beam light diaphragm and the high-beam light diaphragm are parts of a rigid composite diaphragm and that the high-beam diaphragm is arranged in the high-beam volume at an angle to an optical axis of the projection light module so that its distance from an optical axis of the projection light module along the optical axis increases with increasing distance from the diaphragm edge.

As viewed from the light sources, this means that with increasing distance from the light sources the surface of the vertical diaphragm comes closer to the optical axis. For a light source arranged on the side of the vertical diaphragm facing the optical axis this means that after reflection, the light from the light source incident on the side of the vertical diaphragm and mirror-wise reflected there, encloses a larger angle with the optical axis than before the reflection. For this light, therefore, the vertical diaphragm acts so that it increases the opening angle of the light incident there.

For a light source arranged on the side of the vertical diaphragm facing away from the optical axis this means that after reflection, the light from the light source incident on the side of the vertical diaphragm and mirror-wise reflected there, forms a smaller angle with the optical axis than before the reflection. For this light, therefore, the vertical diaphragm acts so that it decreases the opening angle of the light incident there. The degree of increase and decrease thus results from the angle enclosed by the side of the diaphragm with the optical axis.

This shows that the vertical diaphragm that inventively extends aslant with respect to the optical axis provides additional degrees of freedom for generating light distributions, which are not present in the prior art. With two funnel-shaped converging high-beam diaphragms, the light radiated from a close-up lens or a plurality of close-up lenses into the wide funnel opening light can be directed onto the narrow funnel opening, which preferably lies in the focal plane or within a predetermined distance from the focal plane.

In one embodiment the low-beam light is reflection coated both on its upper side and on its underside. In one embodiment the edge of the vertical diaphragm facing the secondary lens system is arranged in horizontal y direction at a lateral distance dy from the optical axis of the light module.

At least two high-beam diaphragms may be arranged in the high beam volume, each of them comprising a more vertically than horizontally extending diaphragm edge, and that are arranged in the high-beam volume at an angle to an optical axis of the projection light module so that their distance from an optical axis of the projection light module increases with increasing distance of the diaphragm edge along the optical axis.

In another embodiment the high-beam diaphragms arranged at an angle to the optical axis lie on one side of the optical axis. A further embodiment is distinguished in that the high-beam diaphragms arranged at an angle to the optical axis lie on different sides of the optical axis, so that one of them is on the right and the other one is on the left of the optical axis. At least parts of more vertically than horizontally extending edge of the high-beam diaphragm or of more vertically than horizontally extending diaphragm edges of the high-beam diaphragm lie in the focal plane of the projection lens.

In one embodiment the projection light module includes a plurality of semiconductor light sources and primary optics that collects and focuses the light of the semiconductor light sources, which optics are arranged in the low beam light volume so that the focused light is concentrated into a region in which lies the horizontal diaphragm edge, and that the projection light module includes several more semiconductor light sources and primary optics that collects and focuses the light of the semiconductor light sources. The primary optics are arranged in the high-beam volume so that their light is concentrated into a region where the horizontal diaphragm edge lies. The partial high beam volumes generated by the obliquely extending vertical diaphragms is preferably associated with at least one semiconductor light source that emits its light into the respective high beam sub-volume.

By switching on and off—individually or in groups—the semiconductor light sources, the light beams associated with these high-beam sub-volumes can be turned on and off. In each high-beam sub-volume, at least one light source which individually feeds light into this high beam sub-volume and is individually controllable, generates an individual light beam for each high-beam sub-volume so that various partial high-beam distributions can be generated by switching on and off said light sources.

In another embodiment, at least one surface of the high-beam diaphragm, which extends at an angle to the optical axis and faces a beam of light, has a reflective coating. In still another embodiment a partial surface of the high-beam diaphragm lying directly at a more vertically than horizontally arranged diaphragm edge has a dissipating structuring. In addition that at least one surface of a high-beam diaphragm facing a beam of light includes several facets, or reflector segments. Similarly, a further high-beam diaphragm is arranged transversely to the optical axis. In yet another embodiment the edges of the high-beam diaphragms are not in the same area as the edge of the low-beam diaphragm.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
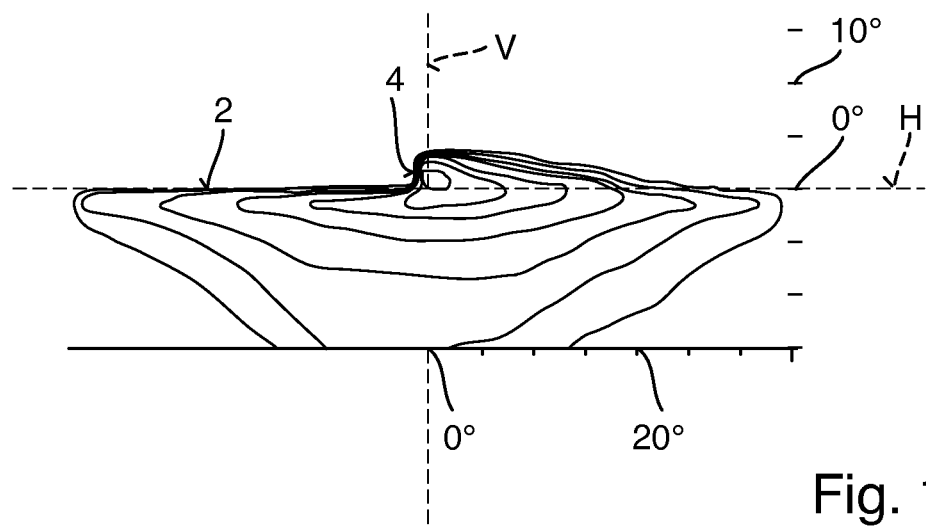
FIG. 1 shows a sum of a low-beam distribution and a partial high-beam distribution.

FIG. 1 shows a light distribution, which results as the sum of a low-beam distribution with at least partially horizontally extending bright-dark boundary 2 and a partial high-beam distribution with partially vertically extending bright-dark boundary 4. Such a light distribution results at a normal use of a projection light module for a motor vehicle headlight with a motor vehicle built-in headlight on a screen located in the forward direction several meters in front of the vehicle and is arranged perpendicular to the road and to the main emission direction of the projection light module. FIG. 1 shows in particular a low beam with partial high beam as it is generated by a headlight provided for installation on a vehicle side, or by a light module of such a headlight.

Those having ordinary skill in the art will appreciate that, when in the present application direction and location information such as above, below, right and left is used, it always relates to a position of the projection light module with this intended use.

A central point of such light distribution is the HV point, which arises as the intersection of a vertical line V, which crosses the direction of the main emission, with a straight line H that lies at the level of the horizon in front of the vehicle. The numbers represent respectively angular deviations to the direction, which is perpendicular to the screen and passes the HV point. The vertex of the angle is in the projection light module. The closed curves are lines along which the brightness is constant. The brightness decreases from outside to inside. This applies to all light distributions shown in this application.

Figure 2:
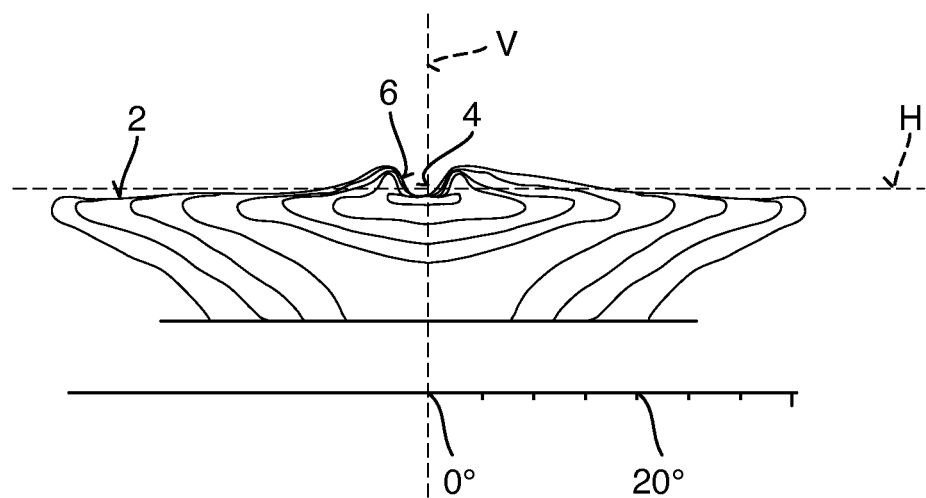
FIG. 2 shows a sum of two partial high-beam distributions, and the low-beam distribution of a pair of headlights.

FIG. 2 shows a sum of two partial high-beam distributions, as well as the low-beam distribution largely lying below the horizon in the negative region of the ordinate values of the projection light module of the headlights on both mounting sides (right and left in the vehicle) with a shadow limited left and right by vertical bright-dark boundaries 4, 6 in the left, central angle range of the high beam. The shadow is generated where there are other road users. Dazzling of these road users who are here on the opposite traffic side can thus be avoided. The positioning of the shadow and setting its width is done by automatically controlled pivoting of the light modules of both sides.

Figure 3:
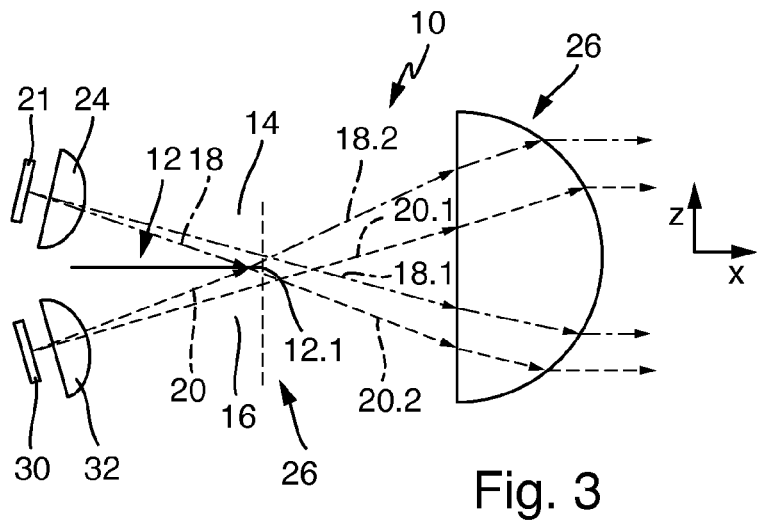
FIG. 3 shows an illustration of a projection light module in a vertical section.

FIG. 3 shows a highly schematic illustration of a projection light module 10 having a horizontally aligned low-beam diaphragm 12, which divides the projection light module into a top low-beam volume 14 adapted to generate a low beam, and a bottom high-beam 16 adapted to generate a partial high beam. The low-beam volume is located above the diaphragm 12 in which runs the low-beam path 18. The high-beam volume is the partial volume located below the diaphragm 12 in which runs the high beam path 20.

The light module 10 is shown in a vertical section. When the device is used as intended, the x direction is parallel to the longitudinal axis and the z axis is then aligned parallel to the vehicle's vertical axis.

Above the low-beam diaphragm 12 are arranged low-beam light sources and primary optics 24 which bundles and focuses the light of the low-beam light sources. The low-beam light sources are preferably half-space light emitters, in particular semiconductor light sources such as LEDs, which are so arranged that their main emission direction is slanted to the low-beam diaphragm and are directed at the edge 12.1 of the low-beam diaphragm facing the secondary lens system.

Each light source is associated with a primary optics, for example a lens, a substantially only a light-refractive transparent body, or alternatively a transparent body comprising additional reflective properties, or a concave mirror, which collimates and focuses the light of this light source, and preferably only the light of this light source, on the diaphragm edge 12.1.

In this way, at the diaphragm edge 12.1 arises inner light distribution limited by the diaphragm edge with a bright zone located above the diaphragm edge. The region in which the internal light distribution is produced is also referred to as intermediate image plane 26.

Figure 4:
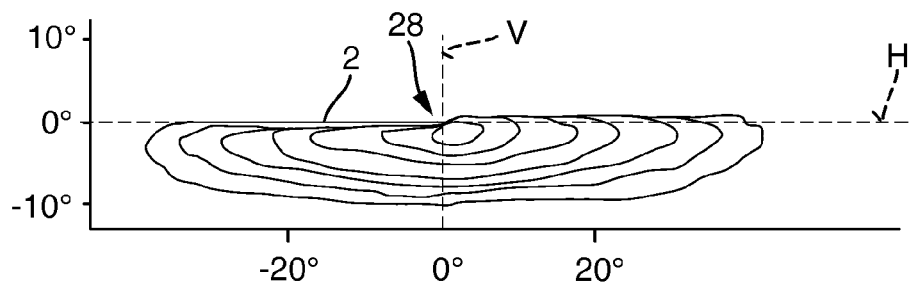
FIG. 4 shows a low-beam light distribution.

The internal light distribution is projected by the secondary lens system 26, which is preferably realized as a lens, as an outer light distribution into the outside perimeter of the projection light module 10, which, for example, results in the low-beam distribution shown in FIG. 4.

The bright-dark boundary is an image of the diaphragm edge. The beams 18.1 passing the diaphragm edge on their way from the low-beam light source and the light beams 18.2 first reflected on the low-beam diaphragm, which is preferably provided with a reflective coating, are combined by the secondary lens system in the bright section of the light distribution, whereby light loss which would occur due to the shadowing caused by the low-beam diaphragm, are minimized.

With the exception of the double kink 28, the bright-dark boundary 2 extends horizontally after it arises as an image of the course of the edge of the low-beam diaphragm in the intermediate image plane 26.

In FIG. 3 below the low-beam light source 10 is arranged primary optics 32 that bundles high-beam light sources and the light of these high-beam light sources. The functional description of the low-beam light sources and their primary optics applies analogously to the high-beam light sources and their primary optics. However, it is not necessary that the low-beam light sources and the high-beam light sources (interchangeable) are identical components. This applies analogously to the respective primary optics.

Figure 5:
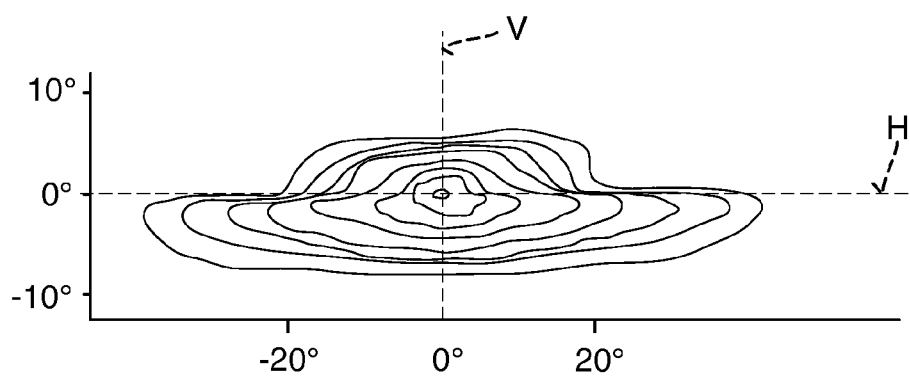
FIG. 5 shows a full high-beam distribution.

The high-beam light sources generate with their primary optics an inner light distribution at the diaphragm edge limited by the diaphragm edge with a bright zone below the diaphragm edge. The inner light distribution is here also projected into the outside perimeter of the projection light module, whereby the low-beam distribution shown in FIG. 4 is expanded to the full high-beam light distribution shown in FIG. 5. The high-beam light zone of this full light distribution above the broad low-beam light distribution is preferably in horizontal direction only about half as wide as the low-beam distribution.

Even with the high-beam component of the light distribution there arises an essentially horizontal bright-dark boundary at the height of the horizon. This bright-dark boundary limits the high-beam light component downwards. However, it is not visible in FIG. 5, because the high-beam component is preferably immediately adjacent to the low-beam light component, and moreover, the high-beam component is located above the low-beam component. The light beams from the high-beam light source passing by the diaphragm edge and the light beams 20.2 first reflected by the underside of the diaphragm, which is preferably provided with a reflective coating, are combined by the secondary lens system in the bright area of the light distribution 10, whereby light losses are avoided and the efficiency of the projection light module is increased in comparison to non-mirrored embodiments.

Figure 6:
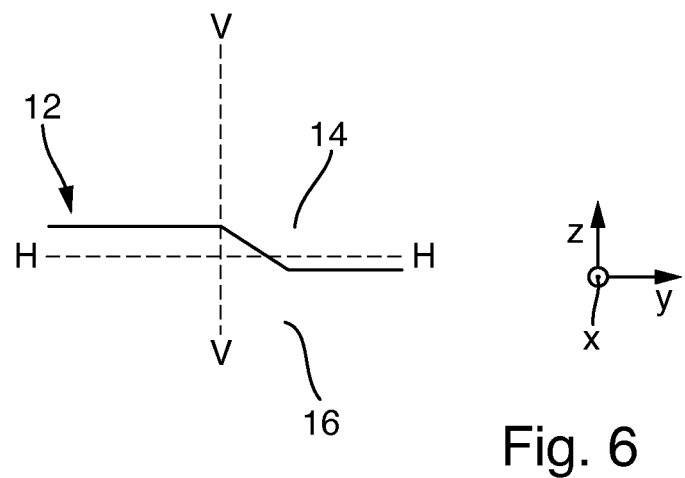
FIG. 6 shows a front view of the intermediate image plane of a simple bi-functional module that still has no vertical high-beam diaphragm.

FIG. 6 shows a front view of the intermediate image plane 26 of a simple bi-functional light module that still comprises no vertical high-beam diaphragm which, with the vertical line V and the horizontal line H of a screen illuminated by the light module. The x direction and the z direction satisfy the definition used above. The y direction is parallel to a transverse vehicle axis. This applies to all figures in this application. Above the low-beam diaphragm 12 mirrored here and also in the invention on both sides is the low-beam light volume. Below the diaphragm, from which here only the diaphragm edge can be seen, is the high-beam volume. If only the high-beam light sources are switched on, only the high-beam volume 16 is filled with light. When only the low-beam light sources are switched on, the low-beam light distribution according to the FIG. 4 results due to the imaging properties of the secondary lens system, which images the inner light distribution that occurs in the intermediate image plane into the outside perimeter of the projection light module while exchanging the top and the bottom.

Figure 7:
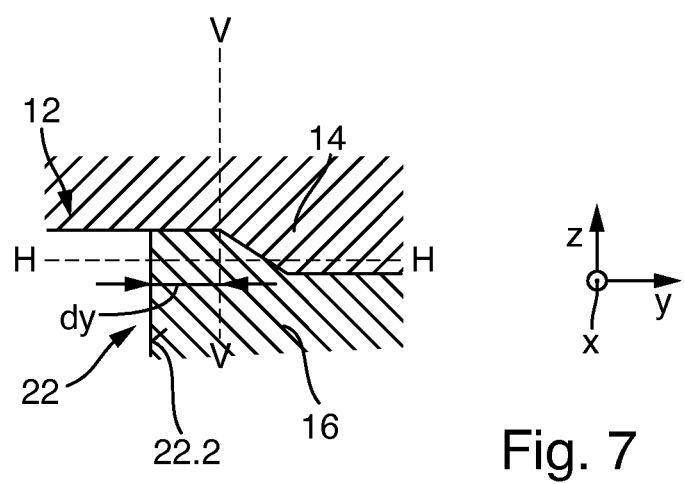
FIG. 7 shows a front view of the intermediate image plane of an inventive bi-functional light module, which comprises a vertical high-beam diaphragm.

FIG. 7 shows a front view of the intermediate image plane of an inventive bi-functional light module which in comparison to the lighting module 5 shown in FIG. 6a additionally comprises a vertical high-beam diaphragm 32, with the vertical line V and horizontal line H of a screen illuminated by the light coming from the light module. Above the low-beam diaphragm mirrored on both sides here and also in the invention is the low-beam volume. Underneath the diaphragm, of which only the diaphragm edge can be seen, is the high-beam volume.

In the shown embodiment, the vertical diaphragm edge facing the secondary lens system is arranged in a horizontal y direction at a lateral distance dy from the HV point and thus from the optical axis. The optical axis is perpendicular to the intermediate image plane and passes through the point HV.

From this front view of the intermediate image plane with the shaded inner light distribution, which arises with switched-on low beam and switched-on right (seen from the front) partial high-beam light source in the intermediate image plane, results—due to the imaging properties of the secondary lens system which images the inner light distribution occurring in the intermediate image plane into the outside perimeter of the projection light module—a light distribution as that qualitatively shown in FIG. 1.

In one embodiment, at least portions of the front edge of the additional vertical diaphragm 22 preferably lie in the focal plane of the projection lens. This focal plane is the intermediate image plane 26. These portions of the front edge of the diaphragm 22 are then sharply displayed as a bright-dark boundary in the traffic area in front of the headlights. This vertical bright-dark boundary for the right-side installation in the vehicle is in a horizontal range of about −2° . . . −10°, somewhat left of the center, which is marked by the HV point. Thus, with full high beams, there is a good superposition of light distributions from the left and right headlights in a central area around the longitudinal axis of the vehicle.

The maximum brightness of a high-beam characteristic is usually in the HV point. Because of that, the maximum brightness of the above-described partial high-beam distribution whose vertical bright-dark boundary is on the horizontal axis at −2° to −10°, is found not directly to this vertical bright-dark boundary, but a few degrees next to it. This results, for example with the partial high-beam operation, in a lower range of the partial high beam light at the bright-dark boundary than if the brightness maximum is closer to the light-dark boundary. To generate the maximum luminosity as close as possible to the vertical bright-dark boundary, the partial area 22.2 of the vertical diaphragm 22 that faces the optical axis of the projection light is preferably at least partially mirror-coated and is either flat or specially shaped in order to achieve an optical effect and to distribute the mirrored light beam in a defined manner.

Such a mirroring of the surface in connection with a light-technically advantageous shape of this diaphragm 22 provides a further degree of freedom in the design of the light module, which allows an improvement in the light-technical properties. This is so due to the possibility to use the side face 22.2 of the vertical diaphragm 22, which serves as a reflector, to deflect the incident light to desired directions in both the vertical and horizontal plane.

On the vertical edge of the light distribution there should develop not only a very high light intensity (brightness), but also a soft gradient of brightness so that this bright-dark boundary in the full high-beam mode, in which the bright-dark boundary of the partial high beam of the right mounting side is preferably located in the bright region of the partial high beam of the left mounting side, is as inconspicuous as possible. To ensure this, one embodiment provides a structure (e.g. matting) of the front edge of the vertical diaphragm 22.1, or rather the side face 22.2 of the vertical diaphragm immediately adjacent to the front edge.

Figure 8:
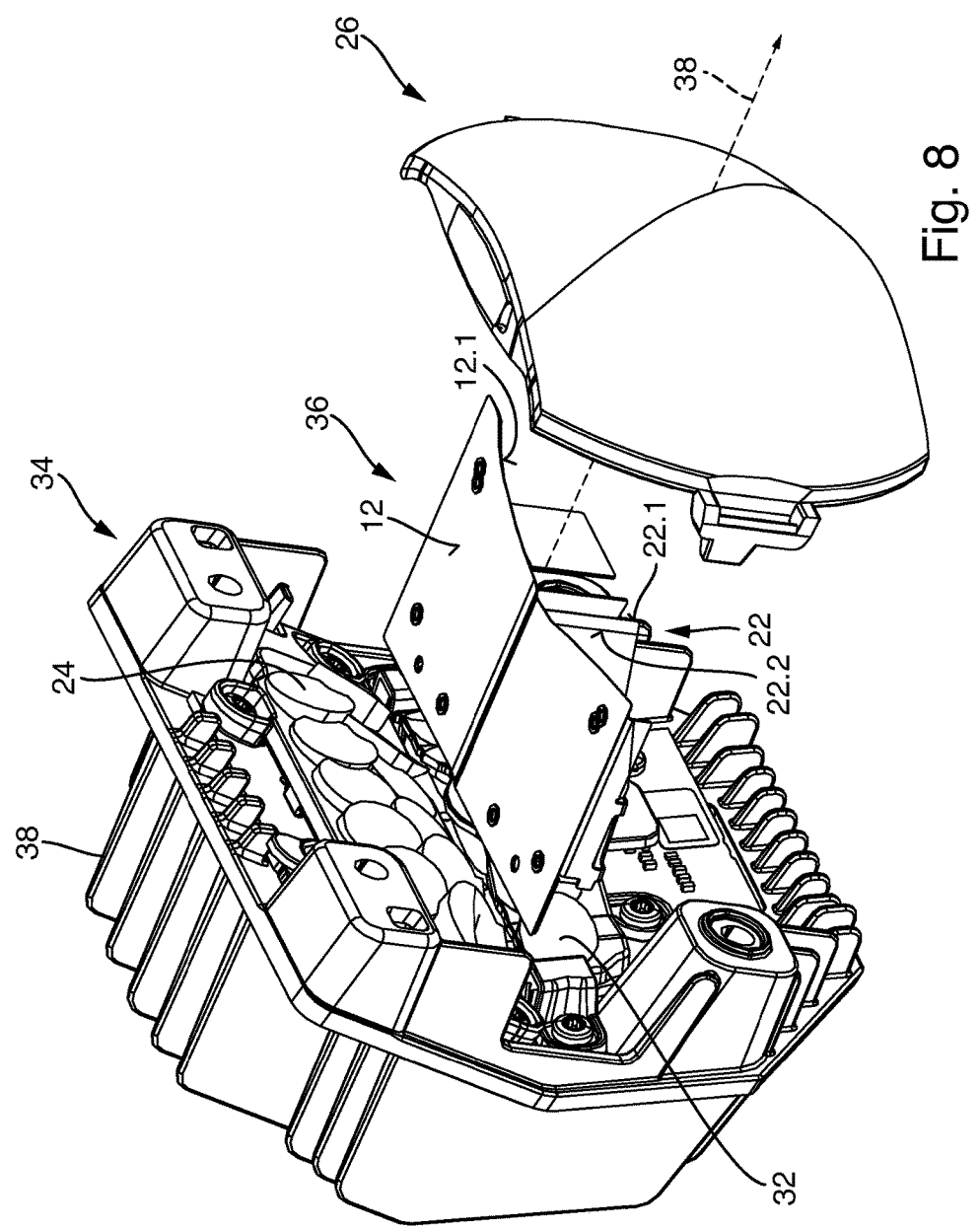
FIG. 8 shows a perspective iso view of a complex light source, a composite panel and a secondary lens system of an embodiment of a light module according to the invention.

This is shown schematically in FIG. 8. With such a structure, which replaces the reflective coating in a narrow range whose width is preferably smaller than 2 mm, a scattering effect and hence the desired soft curve of the brightness is achieved right and left of the bright-dark boundary.

A further embodiment is characterized in that the side of a vertical diaphragm extending at an angle to the optical axis and directed to the optical axis of the module comprises several facets, or reflector segments. It is also preferred that these facets, or reflector segments, have different reflective properties.

FIG. 8 shows a perspective iso view of a complex light source 34, a diaphragm arrangement 36 and a secondary lens system of an embodiment of a light module according to the invention. The complex light source here comprises a heat sink, a plurality of semiconductor light sources and primary optics 24, 32, which are combined into a structural unit. The dotted line represents an optical axis 38 of the light module. The view is from the front and above. Of the primary optics 24, 32, which are realized here as a light-refracting transparent solids also working with total internal reflections, one can substantially see the light exit areas. The semiconductor light sources are hidden here by the primary optics. Preferably one semiconductor light source acts together with a primary optic so that each primary optic collimates the light from exactly one semiconductor light source and the light from a semiconductor light source is in each case fed into only one primary optics.

The composite diaphragm 36 has a low-beam diaphragm 12 with a low-beam diaphragm edge 12.1, which is substantially horizontal and which in the range of the optical axis has a level delimited by two kinks, with which the known asymmetry of the low-beam light distribution is generated. The surface of the diaphragm 12 visible in FIG. 8 is preferably reflective. A portion of the semiconductor light sources is arranged together with the respective associated primary optics in the low-beam volume in such a manner that the light is concentrated on an area on the diaphragm edge, whereby the inner light distribution is created in the intermediate image plane, which is projected by the secondary lens system as a low beam.

Another part of the semiconductor light sources is arranged together with the respective associated primary optic in the high-beam volume located underneath the diaphragm in such a manner that their light is concentrated in an area on the diaphragm edge, whereby the inner light distribution is generated in the intermediate image plane, which is projected by the secondary lens system as the high-beam light distribution or partial high-beam distribution, depending on which light sources are switched on. These light sources are also referred to hereinafter as high-beam light sources. The vertical diaphragms 22 will be discussed in the description of FIG. 9.

Figure 9:
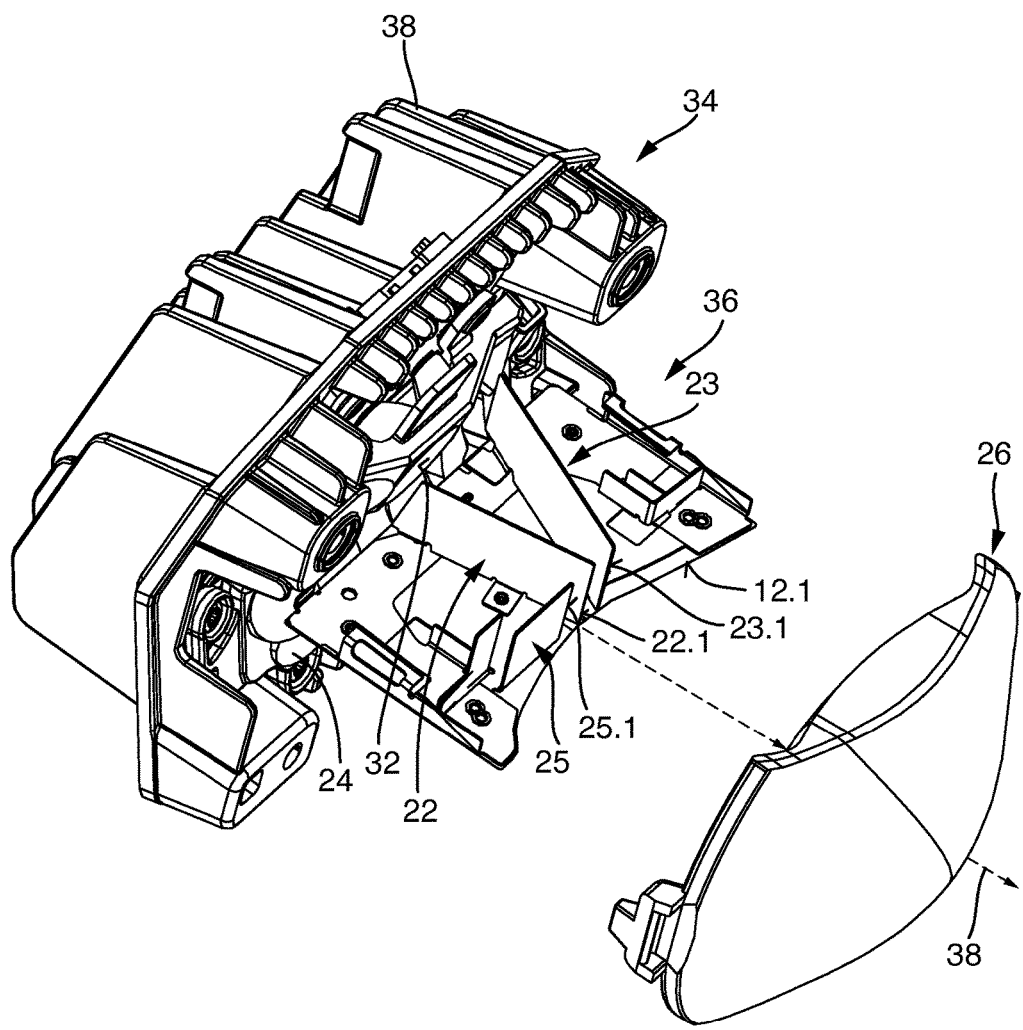
FIG. 9 shows the subject of FIG. 8 in a perspective view obliquely from the front and below.

FIG. 9 shows the subject of FIG. 8 in a perspective view obliquely from the front and downwards and thus represents in particular the high-beam volume. In this embodiment, the composite diaphragm 36 has, in addition to its horizontal part 12, vertical diaphragms 22, 23, which divide the high-beam volume into the sub-volumes.

Each of the vertical high-beam diaphragms divides the high-beam light volume into a right high-beam volume, which with the mentioned use is situated right of the respective high-beam diaphragm, and a left high-beam volume, which is situated left of the respective high-beam diaphragm, wherein the diaphragm edge is arranged such that it is displayed by the secondary lens system as a more vertically than horizontally extending bright-dark boundary in the outer light distribution. In this application is those having ordinary skill in the art will appreciate that the angle enclosed by the diaphragm edge with the vertical line is less than the angle enclosed by the diaphragm edge with the horizontal line. The low-beam diaphragm 12 and the high-beam diaphragms 22, 23 form an inherently rigid composite in the form of the composite diaphragm 36, and the high-beam diaphragms 22, 23 are arranged in the high-beam volume in such a manner that their distance from an optical axis 38 of the projection light module along the optical axis increases with the distance from the diaphragm edge 22.1, or 23.1 for the diaphragm 23.

In the embodiment illustrated herein, both the low-beam diaphragm edge 12.1 and the diaphragm edges 22.1, 23.1 of the high-beam diaphragms 22, 23 are in an internal area of the secondary lens system 26 and are therefore displayed as sharp bright-dark boundaries. Another high-beam diaphragm 25 is arranged diagonally to the optical axis 38. Although this high-beam diaphragm has an optically effective diaphragm edge 25.1, because of its alignment it has no influencing effect on the light that goes beyond a shading effect. By contrast, the other two high-beam diaphragms 22, 13 do not run across, but at an angle to the optical axis 38 of the light module, or at an angle to the identical optical axis 20 of the complex light source 34. Each of these other two high-beam diaphragms 22, 23 arranged extending diagonally to the optical axis 38 is located on a side of the optical axis 38 and thereby does not cross the optical axis 38. The two high-beam diaphragms 22, 23 arranged obliquely to the optical axis 25 lie on different sides of the optical axis 38 so that one is on the right-hand side and the other is on the left-hand side of the optical axis 38. Two of the three high-beam diaphragms 22, 23, 25 delimit a partial high beam, or a partial high-beam light path. The side of the high-beam diaphragm 22, 23 that extends obliquely to the optical axis and faces the partial high-beam bundle is preferably reflective. In a narrow area, immediately adjacent to the diaphragm edge, the diaphragm surface is preferably structured scattering, for example with a mat finish. The width of the scattering structured area is preferably less than 2 mm, in particular less than 1 mm. This is illustrated in FIG. 8.

Along the low-beam edge 12.1 arise here, that is for the subject of FIGS. 8 and 9, three vertical partial high-beam diaphragm edges 25.1, 22.1, 23.1, and thus three distinct high-beam sub-volumes. In each high-beam sub-volume, at least one individually controllable light source emits an individual light beam for each high-beam sub-volume so that various partial high-beam distributions can be generated by switching on and off said light sources.

Figure 10:
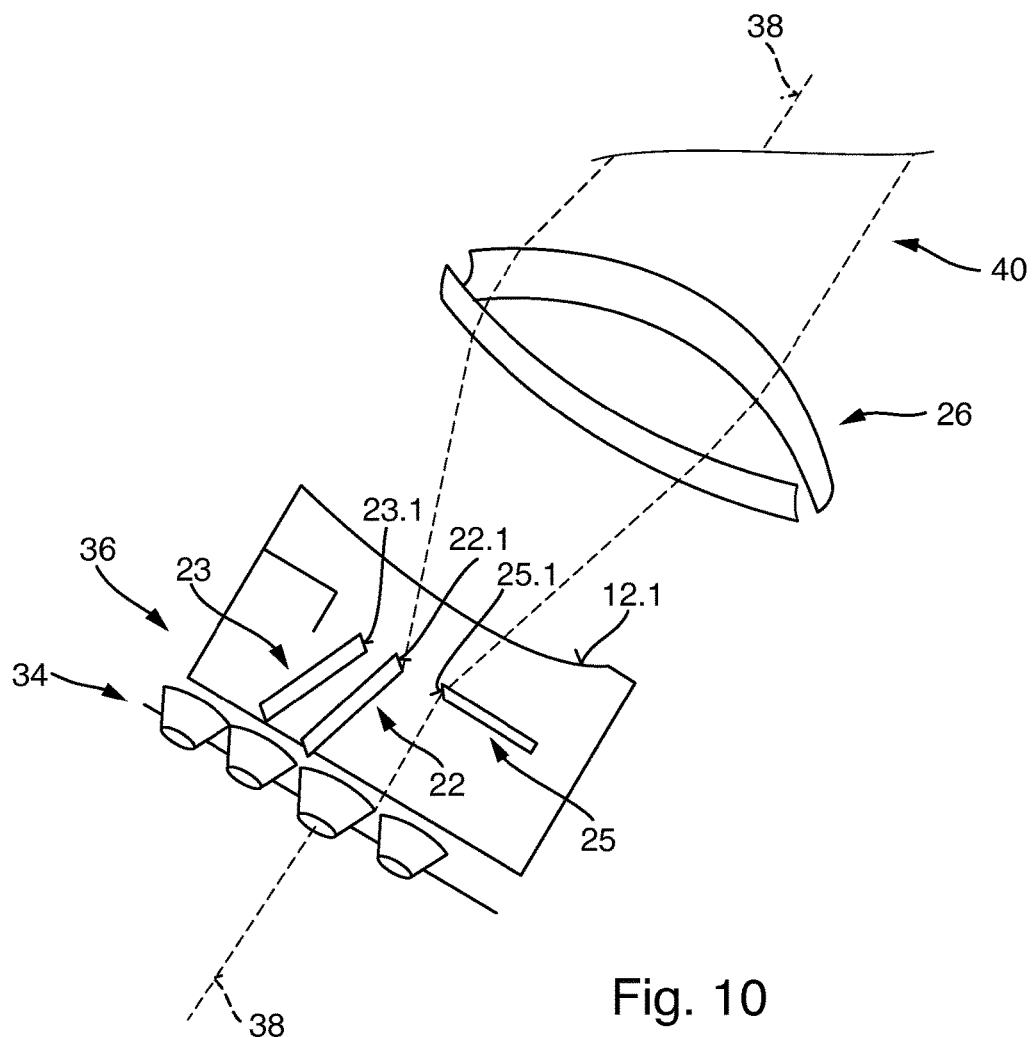
FIG. 10 shows a complex light source with a central beam of light in an oblique view from below.

This will be explained below in greater detail with reference to FIGS. 10 to 16. FIGS. 10, 12 and 14 show beam paths of a design of a complex light source of an embodiment of a projection light module of the invention, and FIGS. 11, 13, 15 and 16 show the resultant partial high-beam distributions.

The view perspective used in FIGS. 10, 12 and 14 is similar to the view perspective of FIG. 9 and shows a complex light source substantially from below. The embodiments shown in the FIGS. 10, 12 and 14 differ from the embodiment shown in the FIGS. 8 and 9 in two features.

A first difference is that the diaphragm edges of the vertical high-beam diaphragm in the subject matter of FIGS. 10, 12 and 14 do not lie in the same area as the edge of the low-beam diaphragm. Under the preferably fulfilled condition that the edge 12.1 of the low-beam diaphragm lie in the focal plane of the secondary lens system, this results in a defocused arrangement of the vertical diaphragm edges. These diaphragm edges are therefore not displayed sharply so that in this embodiment, a less steep curve of the brightness gradient above the bright-dark boundary yields than with a sharp image. A second difference arises from the fact that the two vertical diaphragms 22, 23 disposed obliquely to the optical axis are arranged here on the same side of the optical axis 38. Otherwise, the description of the objects of FIGS. 8 and 9 applies also for the objects of FIGS. 10, 12 and 14 so that these parts of the description will not be repeated.

FIG. 10 shows in detail a complex light source 34 with a central beam 40 which is generated by a combination of a central light source and a central primary optics and is delimited by a first vertical diaphragm edge 25.1, and a second vertical diaphragm edge 22.1 on the right and left.

Figure 11:
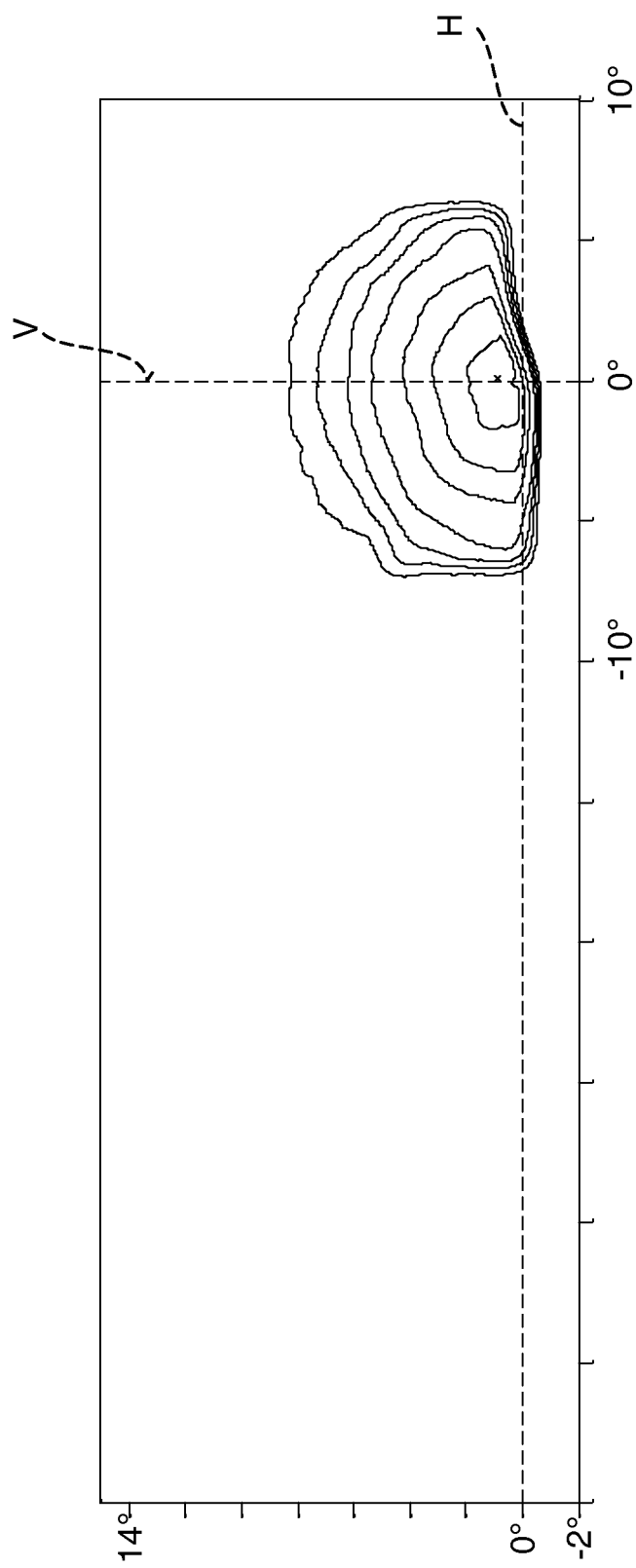
FIG. 11 shows a partial high-beam distribution generated by projection of this light beam.
Figure 12:
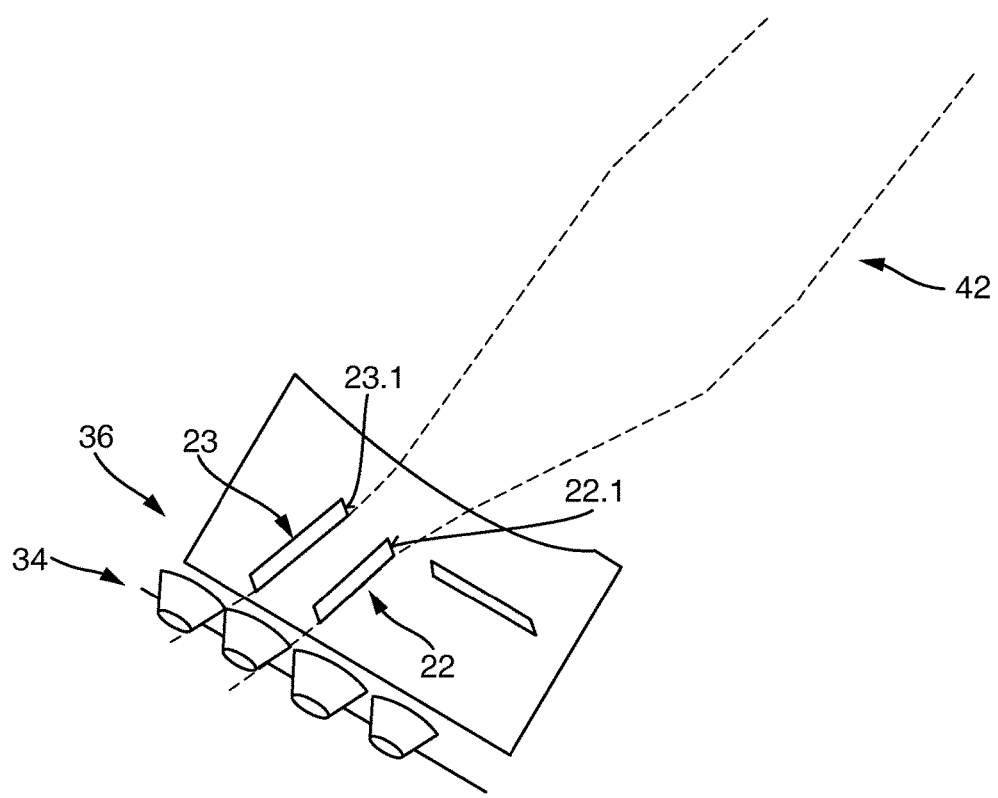
FIG. 12 shows a complex light source with another light beam adjacent to the central light beam in an oblique view from below.

FIG. 11 shows a resultant partial high-beam distribution 41, generated by projection from this light beam, which is limited on the right and on the left by a sharp, vertical bright-dark boundary. The right-hand bright-dark boundary in FIG. 11 results as an image of the right diaphragm edge 25.1 from FIG. 10, because the secondary lens system 26 reverses top and bottom, right and left, and the Figure represents a view from below. The partial high-beam distribution generated by the central light beam is in the horizontal line preferably 10° to 15° wide and, apart from an asymmetry produced by the edge of the low-beam distribution, is symmetrical about a central vertical line that preferably passes through the point HV.

FIG. 12 shows in detail a complex light source 34 with another light beam 42 adjacent to the central light beam and/or overlapping the central light beam 40, which is generated by a further composite light source arranged adjacent to the central light source and a further primary optics that is powered by this further light source and is delimited by the second vertical diaphragm edge 22.1 and a third vertical diaphragm edge 23.1 on the left and right.

Figure 13:
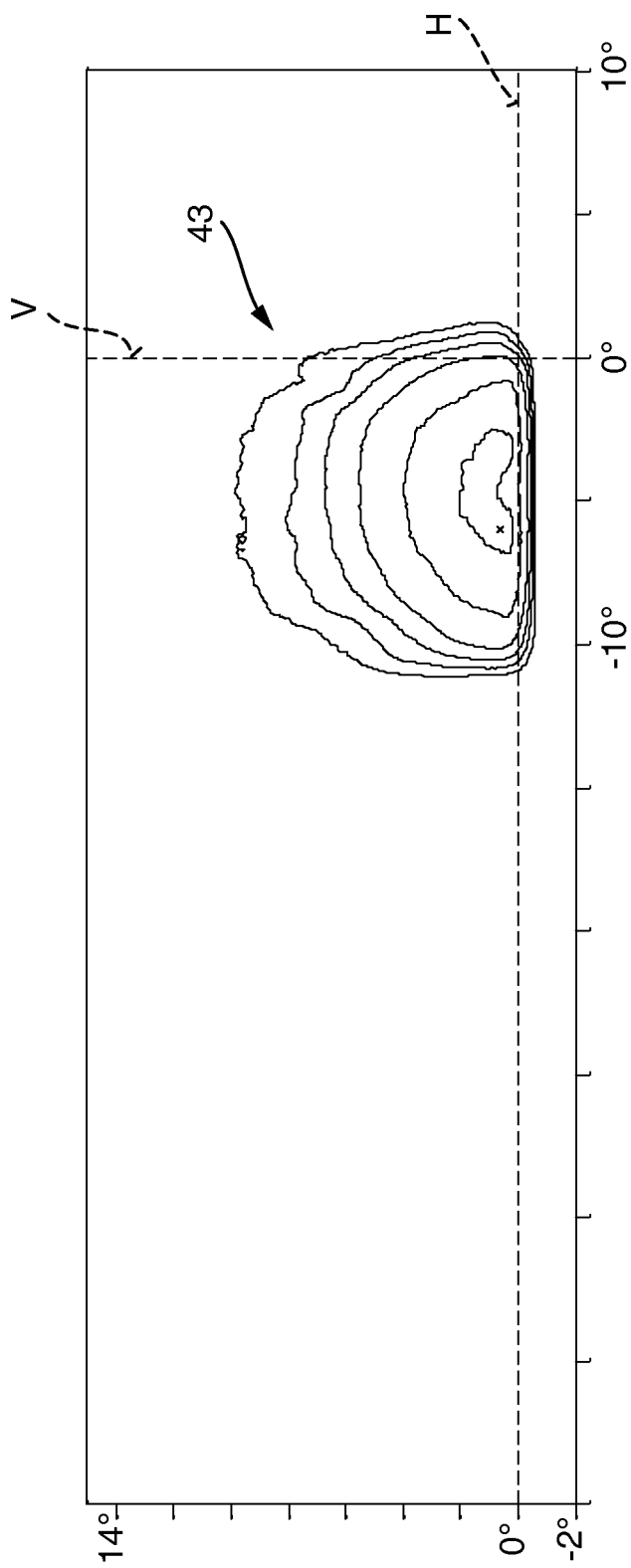
FIG. 13 shows a resultant partial high-beam distribution generated by projection of this light beam.
Figure 14:
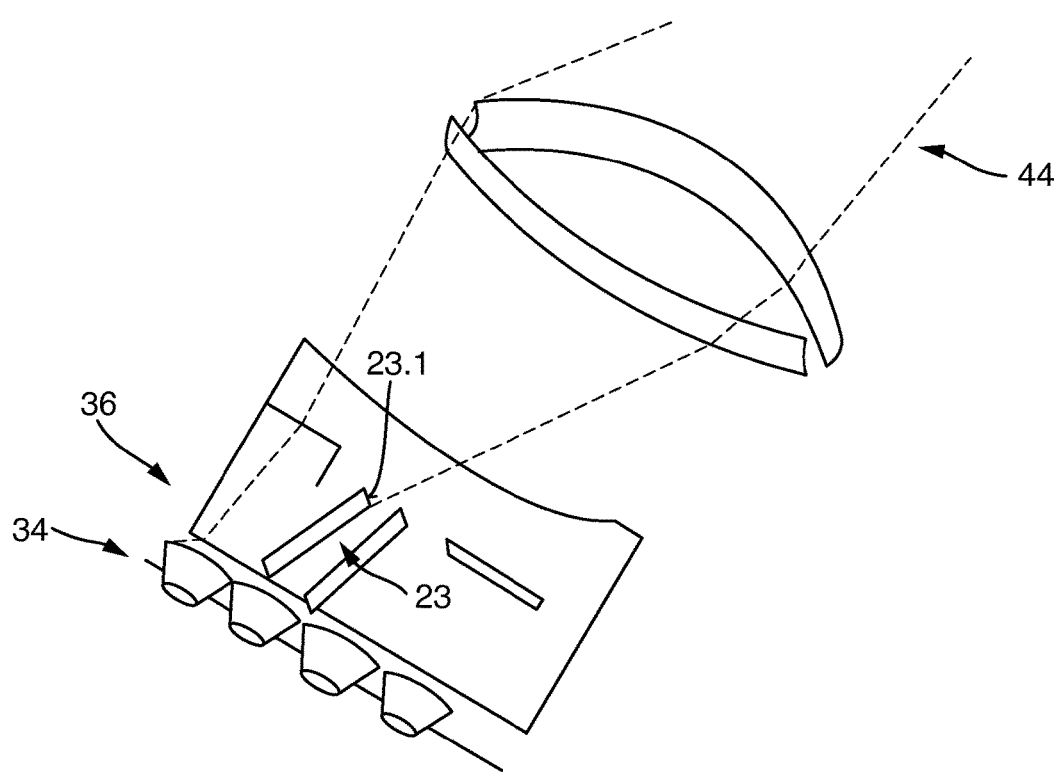
FIG. 14 shows a complex light source with an outer light beam adjacent to the further light beam in an oblique view from below.

FIG. 13 shows a resultant partial high-beam distribution 43, generated by projection of this light beam, which is delimited on either side by a sharp, vertical bright-dark boundary. The right bright-dark boundary in FIG. 13 results as the image of the right-hand diaphragm edge 22.1 from FIG. 12, because the secondary lens system reverses top and bottom and left and right sides. The partial high-beam distribution 42 generated by the other light beam is in the horizontal line preferably 10° to 15° wide and, apart from an asymmetry generated by the diaphragm edge of the low-beam distribution, is symmetrical to a median vertical, which is offset towards the HV point preferably by half the width of the partial high-beam distribution. Thus a partial overlap of the further high-beam distribution and the central light distribution is achieved, in which the overlap area is about half as wide as one of the two partial high-beam distributions of preferably approximately equal width.

FIG. 14 shows in detail a complex light source 34 with an outer beam 44 that is adjacent to the further light beam and/or overlaps the further light beam 43, which outer beam is generated by a combination of an external light source arranged next to the further light source and a primary optics powered by this external light source, and on the right-hand side is delimited by a third vertical diaphragm edge 23.1. On the right-hand side opposite to the left-hand side of the light beam, the light beam is not delimited in this embodiment.

Figure 15:
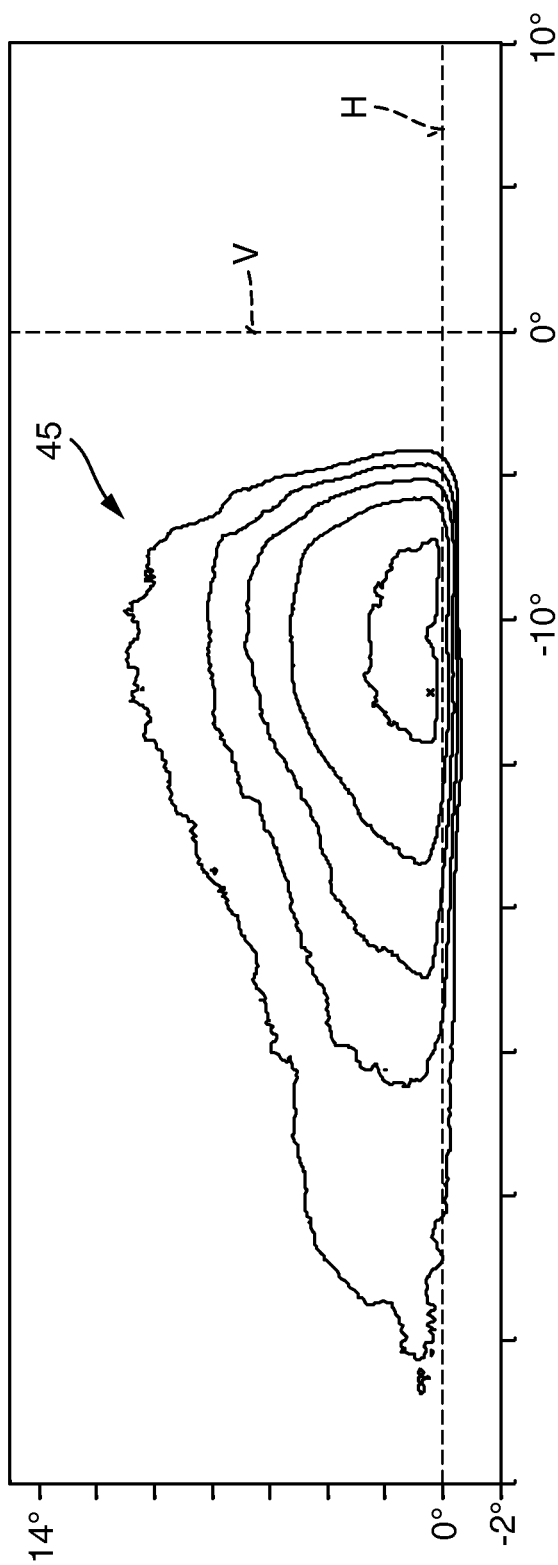
FIG. 15 shows a resultant partial high-beam distribution generated by projection of this light beam.

FIG. 15 shows a resultant partial high-beam distribution 45 generated by projection of this light beam 44, which distribution is delimited on the right by a sharp, vertical bright-dark boundary and its brightness gradually decreases towards the left. The right bright-dark boundary in FIG. 15 results as an image of the right diaphragm edge 23.1 from FIG. 14, because the secondary lens system reverses the top and bottom and right and left sides. The partial high-beam distribution 45 generated by the light beam 44 is in the horizontal line preferably between 30° and 45° wide. Its right bright-dark boundary is preferably in the middle of the adjacent further partial high-beam distribution 43.

Figure 16:
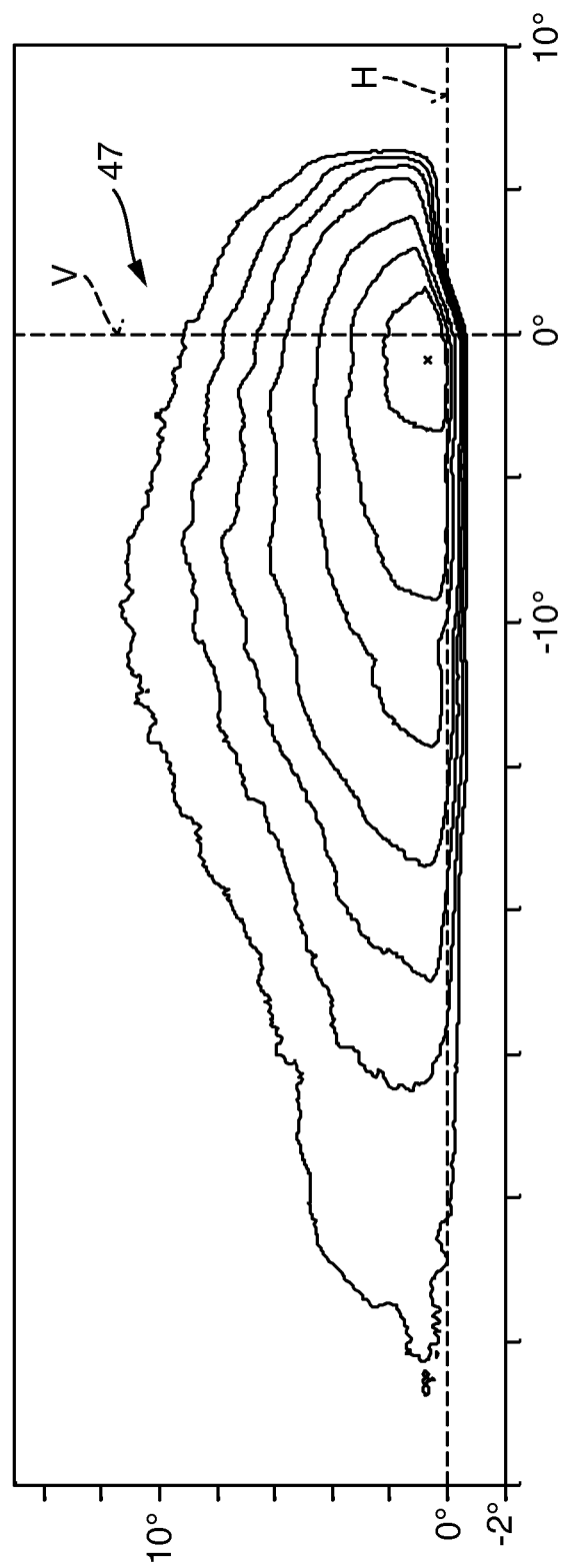
FIG. 16 shows a high-beam distribution of a projection light module on a mounting side.

FIG. 16 shows a high-beam distribution 47 (however, without the low-beam component) of a projection light module on a mounting side (here on the left), as it appears when all high-beam light sources of the projection light module are switched on. A high-beam distribution results by switching on the low beam distribution. By switching off and/or dimming the light sources of the individual light beams 41, 43, 45, the brightness in the range of the high-beam distribution illuminated by the respective beam can be reduced to prevent dazzling other road users who are present in this area, or at least reduce it. This is preferably controlled automatically by analysis of a camera image (for example, the image of an infrared camera), which as such is known. The embodiment described with reference to FIGS. 10 to 16 relates to a projection light module for the left mounting side. For the right mounting side applies a mirrored implementation with respect to the vertical line VV.

The projection light module described with reference to FIGS. 10 to 16 has a rigid composite diaphragm 36 with a continuous horizontal mirror diaphragm 12 and at least two rigid vertical diaphragms 22, 23 connected with each other and with the horizontal mirror diaphragm. Several individually switchable light sources, which are preferably semiconductor light sources and whose light beams 40, 42, 44 are transformed and/or directed in each case by an optical head, radiate beams above (for the low beam) and below (for the high beam) of the diaphragm 12 and to the right and/or left of the vertical diaphragm 22, 23, 25 toward the projection lens/secondary lens system with a concentration zone near the edge 12.1 of the horizontal diaphragm 12.

The at least two of the vertical diaphragms 22, 23 extend, when viewed from the light sources, obliquely to the optical axis and are in a projection light module always on one side of the optical axis. In the projection light module adapted for the other mounting side, the diaphragms are located on the other side. The at least two vertical diaphragms 22, 23 extending obliquely to the optical axis end in an embodiment, as shown in FIGS. 10, 12 and 14, by a wide margin (greater than 10 mm) to the secondary lens system facing front edge 12.1 of the horizontal diaphragm 12 so that their front edges 22.1, 23.1 are displayed slightly out of focus and, with simultaneous activation of their light sources, the individual partial high-beam beams thus homogeneously overlap each other. In a preferred embodiment, unwanted stray light beam paths are shadowed by light dissipating diaphragms 25, which are preferably arranged transversely to the optical axis.

Figure 17:
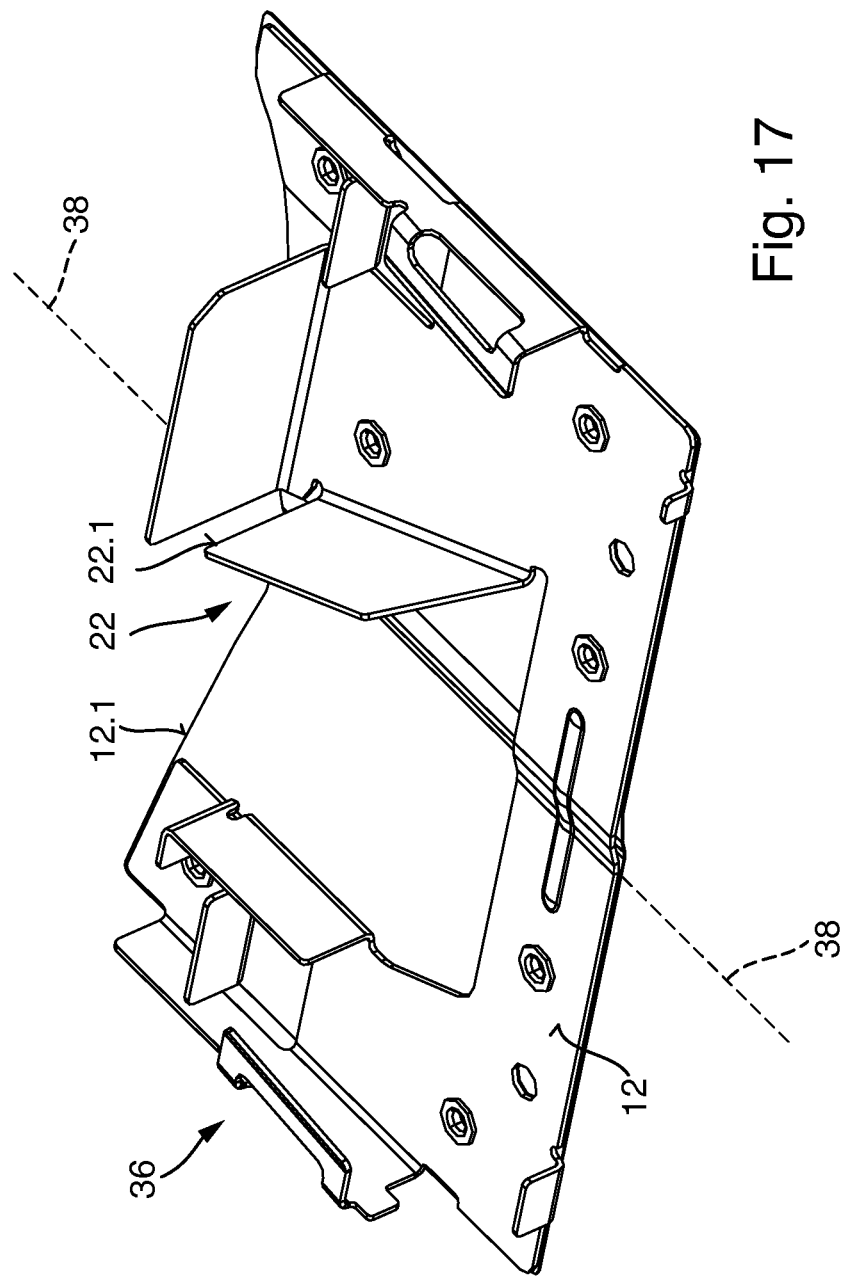
FIG. 17 shows an embodiment of a diaphragm for generation of a low-beam and a partial high-beam distributions with only one vertical diaphragm edge in an oblique view from below and behind.

FIG. 17 shows an embodiment of a composite diaphragm that in combination with the other components of a projection light module so far described is adapted for generating a low-beam distribution and a partial high-beam distribution with only one vertical diaphragm edge 22.1.

This results in a projection light module comprising a rigid composite diaphragm 36 having a continuous horizontal mirror diaphragm 12 and at least one vertical diaphragm 22 connected to it.

Here too, several individually switchable light sources, which are preferably semiconductor light sources and whose light beams are transformed and/or directed by a lens, are above and below the horizontal diaphragm 12 and here to the left of the vertical diaphragm 22 toward the projection lens with a concentration zone near the edge 12.1 of the horizontal diaphragm. The vertical diaphragm 22 having the edge 22.1 extends, as viewed from the light sources, obliquely to the optical axis 38 and preferably ends in the range of the break point of the horizontal diaphragm 12 so that its front, optically effective diaphragm edge 22.1 is displayed sharply as a vertical bright-dark boundary. A baffle 25 extending transverse to the optical axis 38 serves for shadowing unwanted stray light beam paths. A vertical diaphragm edge of the baffle lies here in an extension of the vertical diaphragm and thus provides a shadow line that matches the shadow line of the vertical diaphragm edge 22.1. In the embodiment shown in FIG. 17 each projection light module comprises only a partial high-beam chamber. In this case, it is preferred that in the partial high-beam all high-beam light sources of complex light source are switched on so that a larger luminous flux is available than in the device taught in DE 10 2011 012 742 A1. This requires that the light of all the high-beam light sources is summarized by the optical heads on one side of the single vertical diaphragm. As shown in FIG. 17 this would be the left side, seen from the viewer's perspective.

Figure 18:
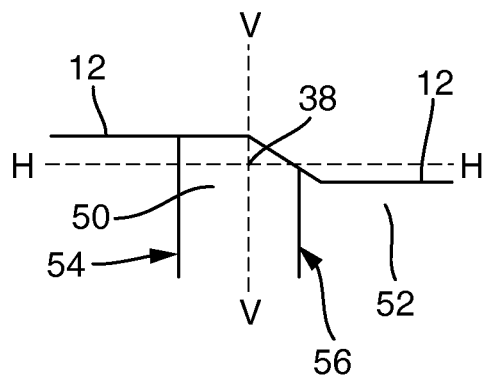
FIG. 18 shows an intermediate image plane of an embodiment, which comprises two chambers located in the high-beam volume.

FIG. 18 shows an intermediate image plane of a further embodiment from the front, i.e., from a viewing direction opposite to the beam direction. This embodiment comprises two chambers or high-beam sub-volumes 50, 52 below the horizontal diaphragm. In this embodiment two chambers or high-beam sub-volumes 50, 52 extend underneath the horizontal diaphragm. A central chamber 50, in which extends the optical axis 38 that pierces the HV point is used to generate a marking spot. This is followed on the right-hand side by a partial high-beam chamber 52. The chambers 50, 52 are delimited by vertical diaphragms 54, 56 which are configured similarly to the diaphragms 22, 23 and together with the horizontal diaphragm 12 form a rigid composite diaphragm. Here too, the sides of the diaphragm facing a light beam—whether it is the horizontal diaphragm 12 or the vertical diaphragm 54, 56—are mirrored, where again dissipating structures can be used, as they have been explained in connection with FIG. 8. The same is true for all embodiments shown in this application.

Figure 19:
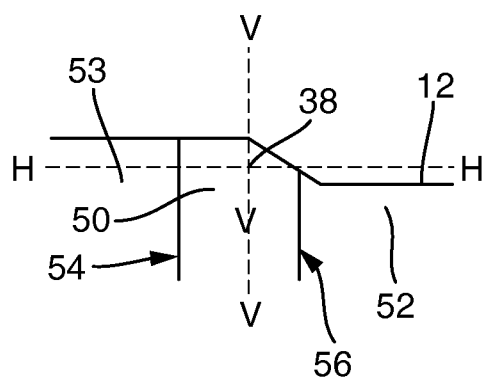
FIG. 19 shows an intermediate image plane of a further embodiment, which comprises 3 chambers in the high beam.

FIG. 19 shows an intermediate image plane of another embodiment. This embodiment includes three chambers 53, 50, 52 extending in the high-beam volume below the horizontal diaphragm 12. A central chamber 50 serves for generating a marking spot. This is followed be a partial high-beam chamber 53, 52 on the right-hand side and the left-hand side. In this case, all three chambers are independently switchable in the high-beam area. This allows performing the marker function with which, in conjunction with a per se known infrared night vision function, for example, a pedestrian can be recognized and marked, that is, can be lit separately. A horizontal rotation of the projection light module as it is, as such, already widely used in the market in the form of curved light modules, ensures correct alignment of the strip on the pedestrian. However, a partial high beam can also be activated right or left or also jointly and simultaneously right and left.

Thus, the light-technical performance of the projection light module increases significantly, because then in certain driving situations both headlights can simultaneously activate the high-beam area left and right, for example next to a preceding vehicle.

Figure 20:
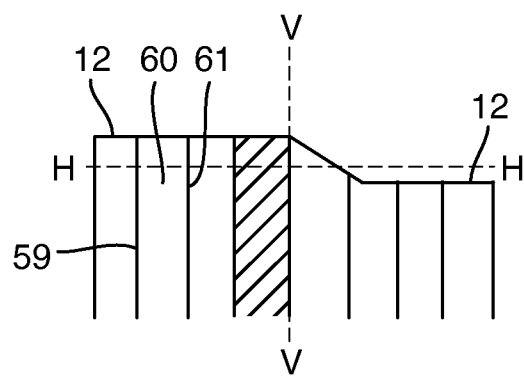
FIG. 20 shows an intermediate image plane of a further embodiment having a plurality of chambers arranged in the high-beam volume below the horizontal diaphragm.

FIG. 20 shows an intermediate image plane of another embodiment. This embodiment includes a plurality of chambers 60 extending in the high-beam volume below the horizontal diaphragm 12, which chambers are each separated by a vertical high-beam diaphragm 59, 61, which is preferably designed like the diaphragms 22, 23. Due to this configuration, the high-beam distribution is divided into a plurality of vertical strips which then form a segmented strip beam. Depending on the number of high-beam sub-volumes and the thus achievable angular width of glare-free zone for oncoming traffic, one can now completely or partially meaning that the swing range can be limited) do without a mechanical pivoting capability for tracking the zone. In particular, the implementation according to the FIG. 20 requires no more pivoting.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A projection light module for a motor vehicle headlight, which is adapted to generate an inner light distribution inside the module, said projection light module comprising a secondary lens system that projects an image of the inner light distribution as an external light distribution into the outside perimeter of the projection light module, and a low-beam light diaphragm, wherein the projection light module separates a low-beam volume of the projection light module located in an built-in headlight above this diaphragm, and a high-beam diaphragm arranged in the high-beam volume below said diaphragm, said diaphragm including a more vertically than horizontally extending diaphragm edge, and which separates the high-beam volume into a right-hand high-beam volume located on the right-hand side of the high-beam diaphragm and a left-hand high-beam diaphragm on the left-hand side of the high-beam diaphragm, wherein the diaphragm edge is displayed by the secondary lens system as a more vertically than horizontally extending bright-dark boundary in the outer light distribution, wherein the low-beam diaphragm and the high-beam diaphragm are components of a rigid composite diaphragm wherein at least two high-beam diaphragms are disposed in the high-beam volume, each of said high-beam diaphragm including an edge that extends vertically more than horizontally, and which are arranged obliquely to an optical axis of the projection light module in such a manner that its distance from an optical axis of the projection light module increases with increasing distance from the diaphragm edge along the optical axis, wherein the edges of this high-beam diaphragm do not lie in the same area as the edge of the low-beam diaphragm, wherein the edge of the low-beam diaphragm lie in the focal plane of the secondary lens system, resulting in a defocused arrangement of the vertical diaphragm edges, which are therefore not displayed sharply resulting in a less steep curve of the brightness gradient above the bright-dark boundary than with a sharp image, wherein the high beam diaphragms are arranged obliquely to the optical axis and lie on one side of the optical axis, wherein a central beam is generated by a combination of a central light source and a central primary optics and is delimited by a first vertical diaphragm edge, and a second vertical diaphragm edge on the right and left, so that a resultant partial high-beam distribution, generated by projection from this light beam is limited on the right and on the left by a sharp, vertical bright-dark boundary, is in the horizontal line preferably 10° to 15° wide and, apart from an asymmetry produced by the edge of the low-beam distribution, symmetrical about a central vertical line that preferably passes through the point HV, wherein another light beam adjacent to the central light beam and/or overlapping the central light beam 40, is generated by a further composite light source arranged adjacent to the central light source and a further primary optics that is powered by this further light source and is delimited by the second vertical diaphragm edge and a third vertical diaphragm edge on the left and right so that a partial overlap of the further high-beam distribution and the central light distribution is achieved, in which the overlap area is about half as wide as one of the two partial high-beam distributions of preferably approximately equal width, wherein an outer beam that is adjacent to the further light beam and/or overlaps the further light beam, which outer beam is generated by a combination of an external light source arranged next to the further light source and a primary optics powered by this external light source, and on the right-hand side is delimited by a third vertical diaphragm edge and wherein the light beam is not delimited On the left hand side opposite to the right-hand side of the light beam.

2. The projection light module as set forth in claim 1, wherein the low-beam diaphragm is coated with reflective material both on its upper side and its lower side.

3. The projection light module as set forth in claim 1, wherein a vertical edge of the vertical diaphragm facing the secondary lens system is arranged in a horizontal direction and crosswise to the optical axis at a lateral distance (dy) from the optical axis of the light module.

4. The projection light module as set forth in claim 1, wherein the projection light module comprises a plurality of semiconductor light sources and a primary optics that collects and focuses the light of the semiconductor light sources, which are arranged in the low-beam volume in such a manner that the focused light is concentrated in an area, in which lies the horizontal diaphragm edge, and that the projection light module comprises other semiconductor light sources and primary optics that collect and focus the light of the semiconductor light sources, which are arranged in the high-beam volume in such a manner that their light is concentrated in an area in which lies the horizontal diaphragm edge.

5. The projection light module as set forth in claim 4, wherein at least one surface of a high-beam diaphragm extending obliquely to the optical axis and facing a light beam has a reflective coating.

6. The projection light module as set forth in claim 4, wherein a partial area immediately adjacent to a more vertically than horizontally extending edge of a high-beam diaphragm has a light-dissipating structure.

7. The projection light module as set forth in claim 1, wherein at least one area of a high-beam diaphragm facing a light beam comprises several facets or reflector segments.

* * * * *